(12) United States Patent
Clifford et al.

(10) Patent No.: US 8,543,784 B1
(45) Date of Patent: Sep. 24, 2013

(54) BACKUP APPLICATION COORDINATION WITH STORAGE ARRAY POWER SAVING FEATURES

(75) Inventors: Thomas G. Clifford, Edina, MN (US); Donald C. Peterson, Eden Prairie, MN (US); Shelley A Schmokel, Prior Lake, MN (US)

(73) Assignee: Symantec Operating Corporation, Mountain View, CA (US)

( * ) Notice: Subject to any disclaimer, the term of this patent is extended or adjusted under 35 U.S.C. 154(b) by 404 days.

(21) Appl. No.: 11/968,001

(22) Filed: Dec. 31, 2007

(51) Int. Cl.
*G06F 12/00* (2006.01)
*G06F 13/00* (2006.01)
*G06F 13/28* (2006.01)
*G06F 1/00* (2006.01)
*G06F 1/26* (2006.01)
*G06F 1/32* (2006.01)

(52) U.S. Cl.
USPC ............................ 711/162; 713/310; 713/320

(58) Field of Classification Search
USPC ......................... 711/161–162; 713/310, 320
See application file for complete search history.

(56) References Cited

U.S. PATENT DOCUMENTS

| | | | |
|---|---|---|---|
| 7,856,526 B2 | 12/2010 | Shibayama et al. | 711/112 |
| 8,006,111 B1 * | 8/2011 | Faibish et al. | 713/324 |
| 2006/0282629 A1 * | 12/2006 | Stuart et al. | 711/159 |
| 2007/0061512 A1 * | 3/2007 | Taguchi et al. | 711/114 |
| 2007/0208921 A1 * | 9/2007 | Hosouchi et al. | 711/170 |
| 2007/0233950 A1 | 10/2007 | Innan et al. | 711/114 |
| 2008/0266698 A1 | 10/2008 | Shibayama et al. | 360/69 |
| 2008/0307175 A1 * | 12/2008 | Hart et al. | 711/162 |

OTHER PUBLICATIONS

Colarelli, Dennis, et al.: "The Case for Massive Arrays of Idle Disks (MAID)," Dept. of Computer Science, Univ. of Colorado, Boulder, pp. 1-6. Jan. 7, 2002.
Hitachi Data Systems, "Hitachi TagmaStore® Adaptable Modular Storage and Workgroup Modular Storage, Architecture Guide," Partner Beyond Technology, pp. 1-85, © 2006 Hitachi Data Systems Corporation, Aug. 2006.

* cited by examiner

*Primary Examiner* — Ryan Bertram
(74) *Attorney, Agent, or Firm* — Campbell Stephenson LLP

(57) ABSTRACT

Various techniques for coordinating the resource allocation and management capabilities of a backup application with the power saving features provided by a storage array are disclosed. One method involves accessing power management information associated with a logical storage unit (LSU) and image property information that indicates a future pattern of access to a backup image. The method also involves selecting the LSU, based upon both the power management information and the image property information, and then causing the backup image to be written to the LSU. Another method, performed by a backup module, involves receiving power management information associated with a storage array, selecting a logical storage unit (LSU) implemented on the storage array, based upon the power management information, and performing a backup storage management operation on the LSU, in response to selecting the LSU.

20 Claims, 5 Drawing Sheets

BACKUP APPLICATION COORDINATION WITH STORAGE ARRAY POWER SAVING FEATURES

FIELD OF THE INVENTION

This invention relates to storage systems and, more particularly, to managing power saving features within a storage system.

BACKGROUND

Disk drives offer many advantages over traditional backup media such as tape. For example, disk drives provide random access, while tape can only be accessed sequentially, making it more time consuming to access stored data from tape. Due to advantages like this, disk drives have gained popularity as backup devices, especially as disk drive prices have decreased relative to the prices of more traditional backup media. The lowered cost of disk drives has also reduced the cost of increasing the redundancy of a disk drive-based storage system (e.g., by using a redundant array of independent disks).

The increased use of disk drives, especially when used to provide increased redundancy, has led to increasing number of disk drives being included in storage arrays. This in turn has led to increased storage array power consumption. This increased power consumption can increase the expense of operating the storage array. Additionally, the increased power consumption of large numbers of disk drives can lead to thermal problems, which can in turn lead to increased failure rates within the storage array. In order to address this concern, some storage array vendors have begun implementing power management features in their storage arrays. For example, massive array of idle disk (MAID) arrays are configured so that inactive disks within the array are powered down. These types of storage arrays make it easier and more economical to operate large storage arrays, relative to similarly-sized arrays that are designed to have all disks operating at full power every hour of every day.

Unfortunately, there is currently a lack of coordination between the power management activity being implemented in a storage array and the data access patterns generated by the storage management system using that storage array. This can result in inefficiencies. For example, a data access pattern may be such that successive reads target storage devices that are currently cycled off by the storage array's power management system. To complete the reads, it may be necessary to cycle each storage device on in succession, which can in turn cause increased power consumption and/or decreased performance. As this example shows, it is desirable to further enhance power management features in storage systems in order to avoid these potential inefficiencies.

SUMMARY OF THE INVENTION

Various techniques for coordinating the resource allocation and management capabilities of a backup application with the power saving features provided by a storage array are disclosed. In one embodiment, a method involves accessing power management information and image property information. The power management information is associated with a logical storage unit (LSU) implemented in a disk storage array. The image property information indicates a future pattern of access to a backup image. The method also involves selecting the LSU, based upon both the power management information and the image property information, and then causing the backup image to be written to the LSU. The method may also involve changing a power state of the LSU, in response to selecting the LSU.

In some embodiments, the method is performed by a backup module, and the power management information is received from a disk storage array controller or other virtualization module. In other embodiments, the method is performed by a virtualization module, and the image property information is received from a backup application.

Selecting the LSU can involve selecting the LSU for inclusion in a backup group. Selection of the LSU can also be dependent upon additional image property information associated with an additional backup image, which indicates that the additional backup image is already stored on the LSU.

The power management information can indicate whether the LSU is in a power saving state or a normal operating state. The power management information can also (or alternatively) indicate power saving features applied to the LSU, such as a policy to shut down the LSU after an inactivity threshold has been reached.

Another method, which can be performed by a backup module, involves receiving power management information associated with a storage array, selecting a logical storage unit (LSU) implemented on the storage array, based upon the power management information, and performing a backup storage management operation on the LSU, in response to selecting the LSU. The backup storage management operation can involve, for example, assigning a backup job to the LSU and/or changing a power state of the LSU. Receiving the power management information can involve reading information, from the storage array, that indicates the power management functionality supported by the storage array.

In one embodiment, the selection of the LSU is also dependent upon image property information associated with the backup image. The image property information indicates a future pattern of access to the backup image.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1:
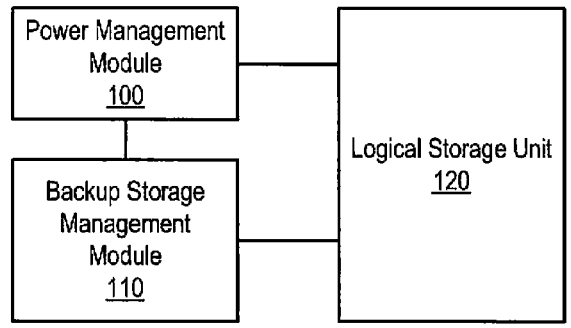
FIG. 1 is a block diagram of a system in which a power management module and a backup storage management module exchange power management information and/or backup image properties in order to coordinate power management and backup management, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

A backup module that controls backup management operations targeting logical storage unit(s) (LSUs) within a storage array can coordinate with a power management module that manages power savings features for the storage array. For example, the backup module can obtain power management information from the power management module, and then modify its backup management behavior based upon that power management information. In alternative embodiments, the backup module can send information describing the properties of one or more backup images to the storage array's power management module, allowing the power management module to select a LSU to which a particular backup image should be written, based upon both the backup image's properties and the LSU's power management information. Additional examples of the coordination between a backup module and a power management module are described in more detail below.

FIG. 1 is a block diagram of a system in which a power management module and a backup storage management module exchange power management information and/or backup image properties in order to coordinate power management and backup management. As shown, power management module 100 is coupled to backup storage management module 110 and a logical storage unit (LSU) 120. These components can be coupled directly or via a network. Such a network can include one or more local- and/or wide-area networks and can be implemented using various topologies, communication protocols, and physical links (e.g., wireless links, coaxial cables, and the like). More detailed examples of how these components can be configured are presented in FIGS. 2 and 3.

Power management module 100 is a software and/or hardware module that is configured to implement one or more power savings features for one or more logical storage units, including LSU 120. For example, power management module 100 can be configured to detect periods of inactivity (e.g., a lack of read and write activity for a certain amount of time, as identified by a value specifying an inactivity threshold) for LSU 120 and, if such a period of inactivity is detected, to cycle the underlying physical disk drive(s) used to implement LSU 120 off. Alternatively, instead of turning the disk drives off, power management module 100 can be configured to reduce the rate at which the underlying disk drives are spinning or otherwise reduce the power consumption of the underlying disk drives.

Other power management policies that can be implemented include limiting the number of disk drives that can be operating in a fully powered state at any given time, such that it may be necessary to change the power state of one disk drive to a non-fully powered state before another disk drive can be brought into a fully powered state. In general, power management module 100 is configured to implement one or more policies that are intended to reduce the power consumption of a storage array that implements LSU 120, relative to the power consumption that would otherwise result if the entire storage array was constantly operating at full power.

Power management module 100 can maintain power management information that describes the power management feature(s) implemented by power management module 100. For example, the power management information can describe the circumstances under which storage devices within a storage array will be switched from a higher power consumption state (e.g., normal operation) to a lower power consumption state (e.g., off or spinning at a reduced rate). Such circumstances can include the lack of recent (as defined by an inactivity threshold, for example) access to a particular disk drive and/or the power consumption mode of one or more other drives (e.g., as noted above, some storage arrays are configured so that some, but not all, disk drives can be fully powered at any given time, such that powering one disk drive on may require that another disk drive first be powered down). Thus, the power management information can include an inactivity threshold (i.e., a value specifying a time period after which an LSU will be switched to a lower power consumption mode if there have been no accesses to the LSU during the time period). Similarly, the power management information can include information specifying the maximum number of LSUs within a set of LSUs that can be operating in a fully powered state at any given time. The power management information can also include LSU spin up delay (e.g., the time required for LSUs to transition from a lower power consumption state to a higher power consumption state) and/or cost metrics (e.g., in terms of power consumption) for operating a given LSU in a fully powered state for a given amount of time as well as for transitioning the LSU between power states.

The power management information can be maintained on a per-LSU basis, for sets of LSUs, or for the storage array as a whole. In general, the power management information maintained by power management module 100 is associated with one or more LSUs. If the power management information is specific to a particular LSU, the power management information can indicate which particular LSU is being described by that power management information.

In some embodiments, power management module 100 provides an interface (e.g., a command line interface (CLI), application programming interface (API), or the like) that allows other applications to access the power management information. For example, in one embodiment, other applications (e.g., such as backup module 110) can query power management module 100 for the current power state of one or more LSUs. In response to receiving such a query, power management module 100 can return information identifying the current power state of the LSU(s) specified in the query. Similarly, if power management module 100 implements other storage management policies (e.g., such as particular inactivity thresholds, limits on the number of active disk drives, grouping of multiple disk drives into power management groups such that all drives in the same power management group are in the same state, or the like), information describing such storage management policies can also be accessed via the particular interface provided by power management module 100.

In some embodiments, power management module 100 can also implement an interface that allows another application to modify the power management information maintained and used by power management module 100. For example, such an interface can allow another application to request that power management module 100 modify the current power state of an LSU, resulting in a change in the specified LSU's power state and in the power management information describing the current power state of the specified LSU. Similarly, such an interface can allow another application to modify the power management policies for a particular LSU or group of LSUs. For example, an application can request an increase or decrease in the inactivity threshold for a particular LSU or group of LSUs.

Backup storage management module 110 is configured as to perform various backup management operations, such as assigning backup jobs to LSUs, configuring multiple LSUs into backup storage groups, maintaining a catalog indicating which LSU (or set of multiple LSUs) stores which backup image, and the like. Backup storage groups can be configured for specific categories of backup jobs, such that certain jobs (e.g., those originating from a certain subsection of an organization) can only be assigned to LSUs in certain backup storage groups.

A backup job is a task that copies a backup image (e.g., a copy of the information being backed up) to a selected LSU. A backup job can copy the backup image directly from the source of the backup image (e.g., from the client computer on which the information being backed up was generated) or indirectly from a database of backup images (e.g., such a database can be generated by a backup server that produces the backup images).

A backup image is a logical data object that contains a copy of the information being backed up. In one embodiment, each backup image is stored as a set of two files that have the same name. The first file is a header file (e.g., as indicated by the file name having no extension) that stores metadata for the backup image and a files file (e.g., as indicated by the file name having a "l" extension) that stores the actual data (e.g., one or more files, directories, file systems, partitions, databases, and the like) to be backed up. The metadata can contain image property information (as described in more detail below) and/or other information (e.g., such as mapping information, file properties, backup creation time, and the like) that describes the files information in the corresponding files file.

In one embodiment, backup storage management module 110 can be part of a backup application such as Symantec NetBackup™, available from Symantec Corporation of Cupertino, Calif. For example, backup storage management module 110 can be part of a NetBackup master server.

Backup storage management module 110 generates image property information that describes the properties of the various backup images maintained by backup storage management module 110. For a given backup image, the corresponding image property information can identify properties such as the types of data being backed up (e.g., by identifying the type(s) of files included in the backup image), the users that own and/or created the files included in the backup image (e.g., by identifying a group, such as a department or division, within an organizational hierarchy as the owner of the files and/or one or more users that created the files), storage group(s) allowed to store the backup image, and the like. It is noted that the types, amount, and format of the properties included in the image property information can vary among embodiments.

The image property information can indicate future access patterns to the backup image. For example, the image property information can identify a retention time (i.e., a "time to live," indicating when the backup image expires), thus indicating the time at which access to the image will cease. Likewise, the image property information can indicate whether the backup image is likely to be duplicated (e.g., by indicating whether the image is a final copy, which will not be subsequently duplicated, or not). Similarly, properties such as file type and/or creators/ownership can be used to indicate future access patterns, in that backup images having similar file types and/or creators/ownership are more likely to be accessed at the same time, while backup images having dissimilar file types and/or creators/ownership are less likely to be accessed at the same time.

LSU 120 is a logical storage device, such as a logical device identified by a logical unit number (LUN) (for brevity, such a logical device is referred to herein as simply a "LUN") or volume. LSU 120 is implemented on one or more physical storage devices. It is noted that the configuration of LSU 120 can vary from the configuration of the underlying storage device(s). For example, LSU 120 can be configured as a redundant array of independent disks (RAID) level 5 volume, while being implemented on a set of physical disks that are configured as mirrors. The storage device(s) on which LSU 120 is implemented can be part of a storage array, which can in turn be configured in any of a variety of different ways (e.g., as a "just a bunch of disks" (JBOD) array, a RAID array, a massive array of idle disks (MAID), or the like). It is noted that the disk drive(s) used to implement a given LSU should all be operating in a fully powered state in order for the LSU to be accessed (e.g., by a backup module).

In one embodiment, LSU 120 is implemented on a MAID array. Typical MAID arrays can include hundreds (or thousands, or more) of disk drives. Some MAID arrays are designed to work under power management policies that allow only 25% of the disks within the array to be operating in a fully powered state at any time.

In this example, power management module 100 and backup storage management module 110 are configured to coordinate with each other by exchanging power management information and/or image property information. In some embodiments, power management module 100 provides an interface that allows backup storage management module 110 to request power management information; however, backup storage management module 110 is not able to request changes in the power state of the LSUs. Backup storage management module 110 then uses the power management information provided by power management module 100 to control its backup management behavior in order to reduce the power state changes caused by backup management operations. More details regarding possible implementations of these embodiments are provided with respect to FIG. 2 below.

In another set of embodiments, the coordination is provided by backup storage management module 110 providing image property information to power management module 100. Power management module 100 then uses this information to select which LSU(s) should be used to store particular backup images. More details regarding the implementation of these embodiments are provided with respect to FIG. 2 below.

In still another set of embodiments, the backup storage management module 110 and power management module 100 are both part of the backup module. In these embodiments, the internal power management module 100 can obtain the power state of the underlying disk drives used to implement the LSU(s) and can change the power state as needed to support the functionality of the internal backup storage management module 110. More details regarding the implementation of these embodiments are provided with respect to FIG. 3 below.

Figure 2:
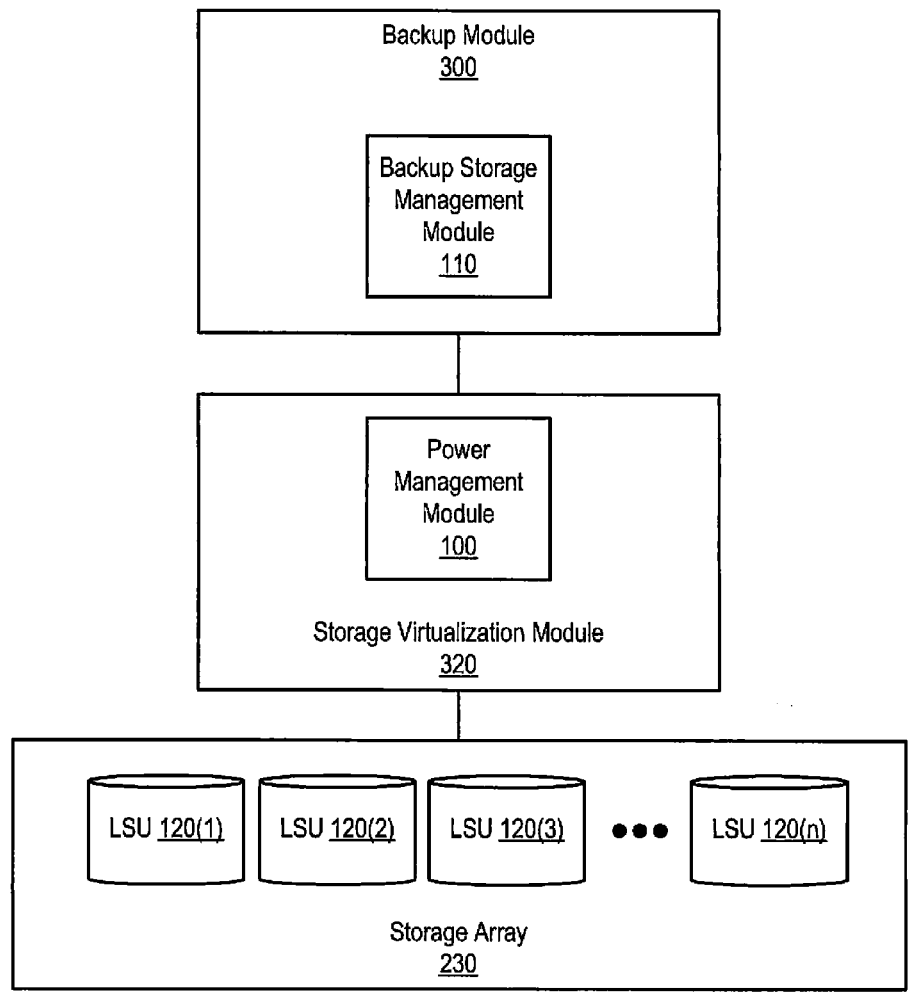
FIG. 2 is a block diagram of a system, which illustrates how the power management module of FIG. 1 can be implemented in a storage virtualization module, according to one embodiment of the present invention.

FIG. 2 is a block diagram of a system, which illustrates how the power management module of FIG. 1 can be implemented in a storage virtualization module. As shown, backup storage management module 110 is included within a backup module 300 (e.g., a backup application such as NetBackup) that is configured to perform various backup operations, such as backups and restores, while power management module 100 is included within a storage virtualization module 320. Storage virtualization module 320 provides n virtualized LSUs 120(1)-120(n) within a storage array 230, where n is an integer greater than or equal to one (1).

Storage virtualization module 320 can be implemented in the same computing device as backup module 300; however, these modules can also be implemented on separate computing devices. For example, in one embodiment, backup module 300 can be implemented on a backup server while storage virtualization module is implemented in a storage array controller coupled to the backup server by a SAN or other network.

Storage virtualization module 320 is configured to organize underlying physical disk drives or logical storage devices implemented on underlying disk drives into LSUs 120(1)-120(n). Storage virtualization module 320 can include an application such as Symantec Volume Manager, available from Symantec Corporation of Cupertino, Calif., as well as underlying hardware such as a storage array controller. Storage virtualization module can be in-band (i.e., in the data path between backup module 300 and storage array 230) or out-of-band (i.e., outside the data path).

In some embodiments, backup storage management module 110 is configured to obtain power management information from power management module 100. As noted above, in some embodiments, power management module 100 provides an interface that allows other applications, such as backup storage management module 110, to request power management information for one or more LSUs. In one embodiment, such an interface is implemented using an API that is based on NetBackup OpenStorage API extensions, available from Symantec Corporation of Cupertino, Calif.

In embodiments in which power management module 100 does not provide an interface, backup storage management module 110 can be configured to discover power management information using device discovery techniques. For example, a Storage Management Initiative Systems (SMI-S) compliant agent can be present within the system of FIG. 2 and configured to manage storage array 230. The SMI-S agent can determine relevant power management information for storage array 230 and provide it to backup storage management module 110 upon request.

Alternatively, the power management information can be stored on storage array 230, allowing backup storage management module 110 to access the power management information by reading it from the storage array. For example, in one embodiment, storage array 230 is implemented using Small Computer Systems Interface (SCSI) devices. The storage array maintains a specific SCSI page that stores information describing the power management functionality supported by the array. Furthermore, another SCSI page can allow backup storage management module to perform polling in order to determine which disk drives are currently operating in a fully powered mode. Backup storage management module 110 can then read power management information from these SCSI pages.

Thus, backup storage management module 110 can obtain power management information directly from power management module 100 via an API or other interface or indirectly via SMI-S extensions or the like. After obtaining power management information, backup storage management module 110 uses the power management information to select a logical storage unit (LSU), based upon the power management information, upon which to perform a backup storage management operation. The backup storage management operation can include assigning a backup job to the LSU, grouping the LSU into a backup storage group, restoring data from the LSU to a user system, and the like.

In this embodiment, backup storage management module 110 can select LSUs for backup storage management operations in a manner that reduces LSU power state transitions. For example, backup storage management module 110 can be configured to prioritize assignment of backup jobs to LSUs that are currently operating in a fully powered state. Similarly, in order to minimize power state transitions, backup storage management module 110 can be configured to continue to assign backup jobs to the same LSU until the job capacity of that LSU has been reached. Once the LSU's job capacity has been reached, backup storage management module 110 can select another LSU (with priority given to LSUs currently operating in a fully powered state) to which the next backup job(s) will be assigned.

Backup storage management module 110 can also use image property information when selecting an LSU. For example, when assigning a backup job, backup storage management module 110 can use power management information to identify which LSUs are currently fully powered, while also using image property information to determine which LSUs store backup images that have similar properties to the backup image that will be written by the outstanding backup job. Backup storage management module 110 can be configured to prioritize assignment of the backup job to LSUs storing backup images with similar properties. For example, backup storage management module 110 can be configured to assign the job to an LSU that stores backup images having the same or similar time periods for post-backup access as the backup image to be written (e.g., as indicated by an expiration date or time to live for each of the backup images). This results in there being a minimal probability that any of the images on that LSU will be accessed (e.g., for restores or duplication) after the time period has elapsed. This in turn makes it likely that the LSU can be transitioned to a non-fully powered state after that time period has elapsed.

Backup storage management module 110 can also use the power management information when selecting an LSU to which a restore operation should be assigned. For example, if multiple copies of the same backup image are present on different LSUs within the storage array (e.g., as determined by accessing a backup catalog), backup storage management module 110 can access the power management information for each of the LSUs that stores that backup image. Backup storage management module 110 can then prioritize selection of one(s) of those LSUs that are currently operating in a fully powered state. Thus, the restore job can be assigned in a manner that minimizes the need to transition the target LSU from a non-fully powered state to a fully powered state.

Furthermore, backup storage management module 110 can use the power management information when selecting LSUs to include in the same backup storage group. For example, backup storage management module 110 can use the power management information to identify power management groups that are limited in the number of LSUs that can simultaneously operate in the same power management groups. Backup storage management module 110 can select LSUs from different power management groups to include in the same backup storage group, thus increasing the likelihood that all LSUs in the same backup storage group can operate in fully powered mode at the same time.

The power management information can also be used when backup storage management module 110 selects an LSU from a backup storage group. For example, the image property information for a backup image can indicate that the backup image can only be stored on LSUs within a particular backup storage group. Backup storage management module 110 can obtain the power management information for the LSUs in that backup storage group and prioritize selection on LSUs in that backup storage group that are currently operating in a fully powered state when assigning a backup job that writes that backup image to the storage array.

In alternative embodiments, instead of obtaining power management information, backup storage management module 110 can be configured to provide image property information to storage virtualization module 320. Then, storage virtualization module 320 is configured to use the image property information, along with power management information generated by power management module 100, in order to select the LSU to which a particular backup image should be written.

For example, storage virtualization module 320 can be configured to send backup jobs to LSUs in a manner that prioritizes the LSUs that are currently operating in a fully powered state. In another embodiment, a backup job writing an image with particular properties (e.g., such as time to live, creator, owner, and/or type) could be sent to an LSU in a manner that prioritizes LSUs that store similar backup images and that are operating in a fully powered state. For example, backup images with the same time to live can be assigned to the same LSU. Similarly, backup images owned by the same group and/or that include the same types of files can be assigned to the same LSU.

Furthermore, after the time to live for a backup image has elapsed, storage virtualization module 320 can be configured to automatically migrate that backup image to an LSU that will be powered down once all images on that LSU are no longer likely to be accessed. Alternatively, power management module 100 can be configured to transition an LSU to a lower power consumption state once all images on that LSU are no longer as likely to be accessed, as determined by accessing the image property information for those images.

Figure 3:
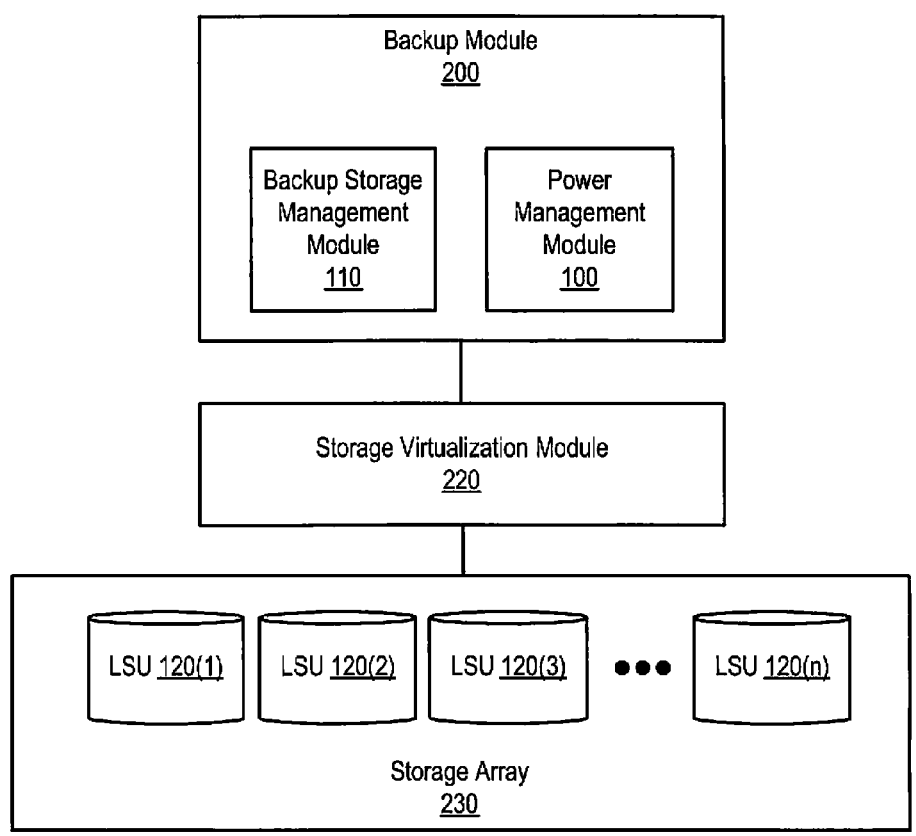
FIG. 3 is a block diagram of a system, which illustrates how the power management module of FIG. 1 can be implemented in a backup module, according to one embodiment of the present invention.

FIG. 3 is a block diagram of a system, which illustrates how the power management module of FIG. 1 can be implemented in a backup module. As shown, power management module 100 and backup storage management module 110 are included within a backup module 200 (e.g., a backup application such as NetBackup) that is configured to perform various backup operations, such as backups and restores. As in FIG. 2, a storage virtualization module 220 provides n virtualized LSUs 120(1)-120(n) within a storage array 230, where n is an integer greater than or equal to one (1). As noted above, storage virtualization module 220 can be implemented in the same computing device as backup module 200; however, these modules can also be implemented on separate computing devices. For example, in one embodiment, backup module 200 can be implemented on a backup server while storage virtualization module is implemented in a storage array controller coupled to the backup server by a SAN or other network.

In this example, backup module 200 can use its internal power management module 100 to control the power state of various LSUs within storage array 230. Accordingly, backup module 200 can use power management information (e.g., obtained by querying the storage array or underlying disk drives either directly or indirectly, as described above) to determine the current power state of an LSU and, based upon anticipated use of that LSU, cause that particular LSU to transition to a different power state, if needed. Power management module 100 within backup module 200 can be configured to control the power states of the LSUs in a manner that reduces the overall power consumption of the storage array, as described above.

In some embodiments, the backup storage management module 110 within backup module 200 is configured to perform backup management operations in a manner that requires the fewest LSUs to be active at any given time. Thus, instead of distributing backup jobs among all candidate LSUs within storage array 230, backup storage management module 110 can assign backup jobs in a manner that prioritizes utilizing the full capacity of each LSU (e.g., such that if x is the maximum number of concurrent jobs supported by an LSU, x sequential jobs will be assigned to that LSU, if possible) as well as grouping the storage of similar (e.g., based upon time to live, likelihood of subsequent duplication, file type, owner, creator, and the like) backup images on the same LSU.

Backup module 200 can also use power management information indicating the costs (e.g., in terms of power consumption) of various actions when selecting backup storage management operations and/or power management operations (e.g., transitioning the power state of an LSU) to perform. For example, if the cost of transitioning the power state of an LSU exceeds the cost of keeping that LSU in a fully powered state during the transition period, it may not be cost effective to transition that LSU to a non-fully powered state, even if the inactivity threshold for that LSU has been exceeded. In situations like this, backup module 200 can calculate the amount of inactive time needed for the power savings of operating the LSU in a non-fully powered state to exceed the cost of transitioning the power state of the LSU. If the anticipated downtime (e.g., as determined based upon image property information indicating whether the backup images on that LSU are likely to be accessed in the future and/or heuristics indicating whether backup module 200 is likely to access that LSU in the near future, based upon past access patterns) is greater than the calculated amount, backup module 200 can transition the LSU to a non-fully powered state. Otherwise, backup module 200 can continue to operate the LSU in the fully powered state.

As noted above, backup module 200 can change the power state of an LSU. For example, if an LSU stores images that are all final copies (as indicated by associated image property information), backup module 200 can cause that LSU to be transitioned into a non-fully powered state. Similarly, if the inactivity threshold for an LSU has been met, backup module 200 can cause that LSU to be transitioned into a non-fully powered state. It is noted that if there is just one LSU within storage array 230, such a scenario can involve simply powering down the entire storage array.

Figure 4:
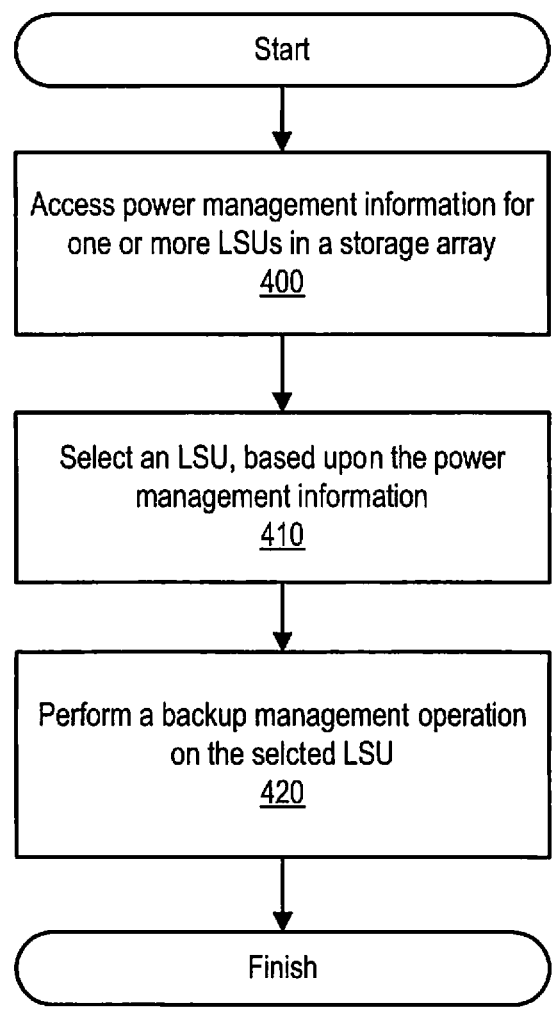
FIG. 4 is a flowchart illustrating a method of selecting, based upon power management information, a logical storage unit (LSU) upon which to perform a backup management operation, according to one embodiment of the present invention.

FIG. 4 is a flowchart illustrating a method of selecting, based upon power management information, a logical storage unit (LSU) upon which to perform a backup management operation. The method begins at 400, when the power management information associated with one or more LSUs in a storage array is accessed. As noted above, accessing the power management information can involve accessing a power management API, reading information from the LSU or storage array, and the like. The power management information can indicate the current power state of the LSU and/or various power management policies in place for that LSU.

Based upon the power management information, an LSU is selected, as indicated at 410. For example, selection of the LSU can be configured to prioritize the selection of a fully powered LSU over the selection of a non-fully powered LSU. It is noted that this selection can also be based upon image property information (e.g., associated with a backup image to be written to the storage array and/or one or more backup images already stored on the LSU).

A backup management operation can then be performed upon the selected LSU, as shown at 420. Backup management operations can include assigning backup jobs and/or restore jobs to the LSU, including the LSU in a backup storage group, and the like. It is noted that, if needed, the selected LSU can be transitioned to a fully powered state prior to performing operation 420.

Figure 5:
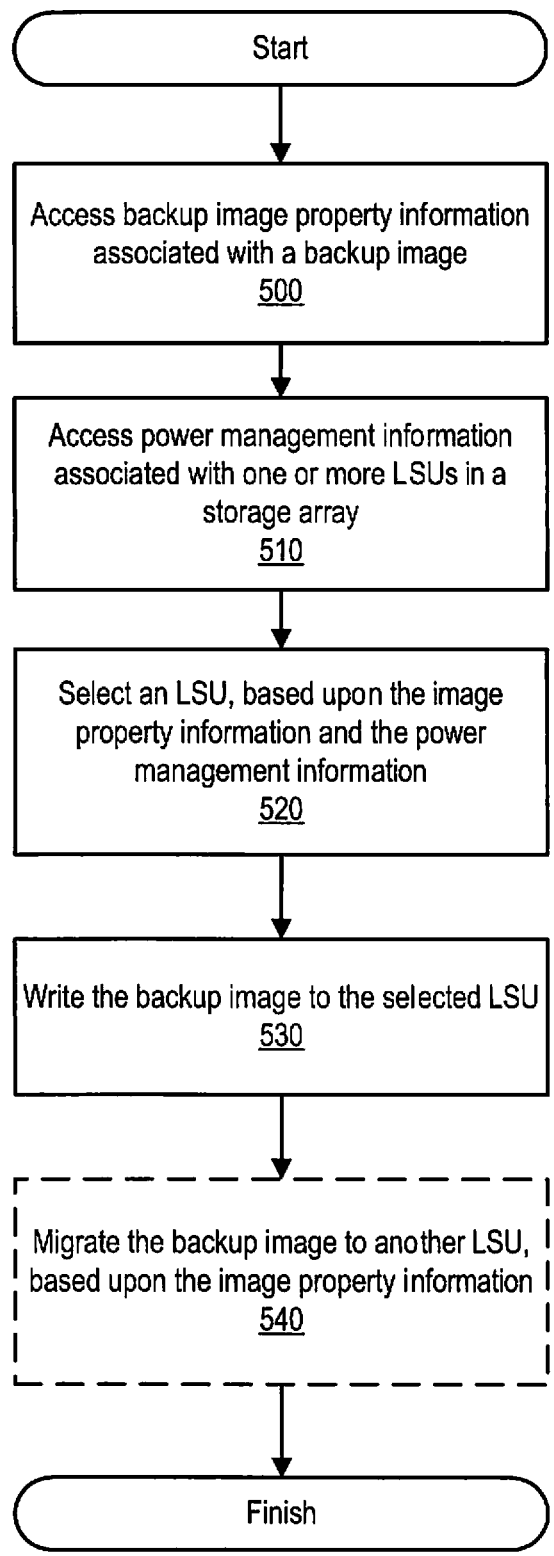
FIG. 5 is a block diagram of a method of selecting, based upon image property information and/or power management information, an LSU to which a backup image should be written, according to one embodiment of the present invention.

FIG. 5 is a block diagram of a method of selecting, based upon image property information and/or power management information, an LSU to which a backup image should be written. This method can be performed by a backup module or a storage virtualization module.

The method begins at 500, when backup image property information associated with a backup image is accessed. This image property information can include information describing the type of files included in the backup image, the owners and/or creators of the files included in the backup image, the duplication status of the backup image, the time to live for the backup image, and the like. In general, this information can be used to predict future access patterns to the backup image.

At 510, power management information associated with one or more LSUs in a storage array is accessed (e.g., as described above with respect to operation 400 of FIG. 4). An LSU is then selected, based upon the power management information and the image property information, as shown at 520, and the backup image is written to the selected LSU, as shown at 530. In some embodiments, the backup image can subsequently be migrated to another LSU, based upon the image property information, as shown at 440.

Figure 6:
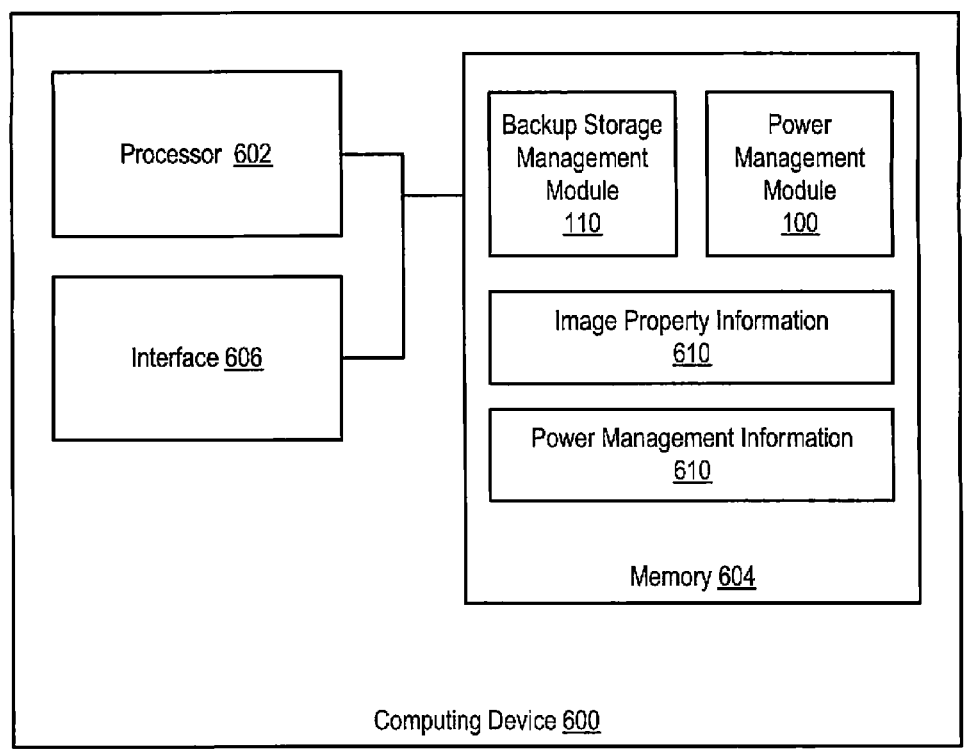
FIG. 6 is a block diagram of a computer system that illustrates how a backup module and/or a power management module can be implemented in software, according to one embodiment of the present invention.

FIG. 6 is a block diagram of a computer system that illustrates how a backup storage management module 110 (e.g., as shown in FIGS. 1-3) and/or a power management module 100 (e.g., as shown in FIGS. 1-3) can be implemented in software. FIG. 6 is a block diagram of a computing device 600 that implements a backup storage management module 110 and a power management module 100. It is noted that in alternative embodiments, a given computing device may implement one but not both of a backup storage management module and a power management module.

Computing device 600 can be a personal computer, network appliance, server, personal digital assistant, mobile phone, storage controller (e.g., an array controller, tape drive controller, or hard drive controller), laptop computer, or the like. In general, computing device 600 is configured to execute software or otherwise provide appropriate functionality to act as a component of the backup system described herein.

As illustrated, computing device 600 includes one or more processors 602 (e.g., microprocessors, Programmable Logic Devices (PLDs), or Application Specific Integrated Circuits (ASICs)) configured to execute program instructions stored in memory 604. Memory 604 can include various types of RAM (Random Access Memory), Read Only Memory (ROM), Flash memory, Micro Electro-Mechanical Systems (MEMS) memory, magnetic core memory, and the like. Memory 604 can include both volatile and non-volatile memory. Computing device 600 also includes one or more interfaces 606. Processor 602, interface 606, and memory 604 are coupled to send and receive data and control signals by a bus or other interconnect.

Interface 606 can include a network interface to various networks and/or interfaces to various peripheral buses. For example, interface 606 can include a network interface via which backup and/or restore requests for backup storage management module 110 are received from backup clients. Interface 606 can also include an interface to one or more storage devices. Thus, backup storage management module 110 can also send communications to manage backups (e.g., by communicating with a storage controller, media server, or the like) via interface 806. Similarly, power management module 100 can communicate with a storage controller via interface 806 in order to cause the storage controller to implement various power management features controlled by power management module 100.

In this example, program instructions and data executable to implement all or part of backup storage management module 110 and power management module 100 are stored in memory 604. Additionally, the image property information 610 generated by backup storage management module 110 and the power management information 610 used by power management module 100 is also stored in memory 604. One or both of these two sets of information can be exchanged between backup storage management module 110 and power management module 100, as described above. The program instructions and data implementing backup storage management module 110 and power management module 100 can be stored on various computer readable storage media such as memory 604. In some embodiments, such software is stored on a computer readable storage medium such as a Compact Disc (CD), Digital Versatile Disc (DVD), hard disk, optical disk, tape device, floppy disk, and the like). In order to be executed by processor 602, the instructions and data can be loaded into memory 604 from the other computer readable storage medium. The instructions and/or data can also be transferred to computing device 600 for storage in memory 604 via a network such as the Internet or upon a carrier medium.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
  coordinating between a power management module and a backup module, wherein
    the coordinating comprises providing one of the power management module or the backup module with access to both power management information and a retention time for a backup image,
    the power management information is maintained by the power management module and is associated with a logical storage unit (LSU), wherein
    a disk storage array implements the LSU,
    the power management module comprises an interface configured to receive a query from the backup module via a network, wherein the query requests a current power state of the LSU, the power management module is configured to transmit the current power state of the LSU to the backup module over the network via the interface, in response to receiving the query, the backup module is configured to perform backups and restores, wherein each of the backups comprises copying a backup image to the LSU, and each of the restores comprises copying data from the LSU to a user system, the retention time is generated by the backup module, and the backup image comprises the retention time;

selecting the LSU, based upon both the power management information and the retention time, wherein the selecting the LSU is performed by the one of the power management module or the backup module; and accessing the backup image on the LSU, in response to the selecting the LSU.

2. The method of claim 1, wherein the power management information is received from a disk storage array controller that comprises the power management module.

3. The method of claim 1, wherein the retention time is received from a backup application that comprises the backup module.

4. The method of claim 1, wherein the selecting the LSU comprises selecting the LSU for inclusion in a backup group.

5. The method of claim 1, wherein the selecting the LSU is also dependent upon a second retention time associated with a second backup image, wherein the second backup image is already stored on the LSU prior to writing the backup image to the LSU.

6. The method of claim 1, wherein the power management information indicates whether the LSU is in a power saving mode or a normal operating mode.

7. The method of claim 1, wherein the power management information indicates power saving features applied to the LSU.

8. The method of claim 1, further comprising changing a power state of the LSU, in response to selecting the LSU.

9. The method of claim 1, wherein the causing the backup image to be written to the LSU comprises assigning a backup job to the LSU.

10. The method of claim 1, further comprising migrating the backup image from the LSU to a second LSU, based upon the retention time.

11. A method comprising:

receiving power management information associated with a storage array, wherein the power management information is received from a power management module, the power management module comprises an interface configured to receive a query from a backup module via a network, wherein the query requests the power management information, and the power management module is configured to transmit the power management information to the backup module over the network via the interface, in response to receiving the query;

selecting a logical storage unit (LSU), based upon the power management information and a retention time, wherein the retention time is generated by the backup module, and the storage array comprises the LSU; and performing a backup storage management operation on the LSU, in response to selecting the LSU, wherein the receiving, the selecting, and the performing are performed by the backup module, the backup module is configured to perform backups and restores, wherein each of the backups comprises copying a backup image to the LSU, and each of the restores comprises copying data from the LSU to a user system, and the performing a backup storage management operation comprises accessing a backup image, wherein the backup image comprises the retention time.

12. The method of claim 11, wherein the backup storage management operation comprises assigning a backup job to the LSU, wherein the backup job writes the backup image to the LSU.

13. The method of claim 11, wherein the backup storage management operation comprises changing a power state of the LSU.

14. The method of claim 11, wherein the receiving power management information comprises reading information, from the storage array, indicating power management functionality supported by the storage array.

15. The method of claim 11, wherein the storage array only comprises a single LSU.

16. A non-transient computer readable storage medium comprising program instructions executable to:

coordinate between a power management module and a backup module, wherein coordination between the power management module and the backup module comprises providing one of the power management module or the backup module with access to both power management information and retention time, the power management information is maintained by the power management module and is associated with a logical storage unit (LSU), the power management module comprises an interface configured to receive a query from the backup module via a network, wherein the query requests a current power state of the LSU, the power management module is configured to transmit the current power state of the LSU to the backup module over the network via the interface, in response to receiving the query, a disk storage array implements the LSU, the backup module is configured to perform backups and restores, wherein each of the backups comprises copying a backup image to the LSU, and each of the restores comprises copying data from the LSU to a user system, the retention time is generated by the backup module, and the backup image comprises the retention time;

select the LSU, based upon both the power management information and the retention time, wherein selection of the LSU is performed by the one of the power management module or the backup module; and access the backup image on the LSU, in response to the selection of the LSU.

17. The non-transient computer readable storage medium of claim 16, wherein the program instructions are further executable to change a power state of the LSU, in response to selecting the LSU.

18. The method of claim 1, wherein the power management information comprises an inactivity threshold.

19. The method of claim 1, further comprising:
communicating information between the power management module and the backup module, wherein
the power management module is implemented in a first computing device,
the backup module is implemented in a second computing device,
the second computing device is separate from the first computing device, and
the communicating comprises transmitting information between the first computing device and the second computing device via a network that couples the first computing device and the second computing device.

20. The method of claim 1, wherein
the backup image comprises a set of files comprising
data that is to be backed up, and
metadata that describes the data.

* * * * *